United States Patent [19]
Hehl

[11] Patent Number: 5,368,466
[45] Date of Patent: Nov. 29, 1994

[54] APPARATUS AND TRANSPORTING UNIT FOR CONVEYING INJECTION-MOLDED ARTICLES AWAY FROM AN INJECTION MOLDING MACHINE

[76] Inventor: Karl Hehl, Arthur-Hehl-Strasse 32, W-7298 Lossburg 1, Germany

[21] Appl. No.: 901,610

[22] Filed: Jun. 19, 1992

[30] Foreign Application Priority Data

Jun. 19, 1991 [DE] Germany ............................ 4120129
Jun. 19, 1991 [DE] Germany ............................ 4120131

[51] Int. Cl.[5] ............................................ B29C 45/40
[52] U.S. Cl. ................................. 425/556; 414/222;
414/331; 414/750; 425/254; 425/403.1;
425/452; 425/DIG. 117; 425/DIG. 118
[58] Field of Search ............... 425/253, 254, 256, 452,
425/403.1, 556, DIG. 117, DIG. 118; 414/222,
331, 750, 788.7, 793.4

[56] References Cited

U.S. PATENT DOCUMENTS

| 3,895,477 | 7/1975 | Yamashita | 414/750 |
| 4,687,403 | 8/1987 | Motoda | 414/32 |
| 4,932,828 | 6/1990 | Katae et al. | 414/331 |
| 5,024,593 | 6/1991 | Hehl | 425/556 |
| 5,032,053 | 7/1991 | Krieg | 414/331 |
| 5,039,299 | 8/1991 | Hehl | 425/556 |
| 5,104,277 | 4/1992 | Bullock | 414/222 |
| 5,203,661 | 4/1993 | Tanita et al. | 414/331 |

FOREIGN PATENT DOCUMENTS

| 0335658 | 4/1989 | European Pat. Off. | |
| 57-184001 | 11/1982 | Japan . | |
| 60-262776 | 12/1985 | Japan . | |
| 63-1632 | 1/1988 | Japan . | |
| 2-92512 | 4/1990 | Japan | 425/253 |
| 4-13536 | 1/1992 | Japan | 414/222 |
| 1071096 | 6/1967 | United Kingdom | 425/DIG. 118 |

*Primary Examiner*—Jay H. Woo
*Assistant Examiner*—Duane S. Smith
*Attorney, Agent, or Firm*—Spencer, Frank & Schneider

[57] ABSTRACT

A transporting apparatus for moving away injection-molded articles from an injection molding machine includes pallets; a charging station for loading the pallets; transporting pallets each individually supporting at least one pallet and coupled thereto for forming a transporting unit; a pallet tower spaced from the charging station for storing a plurality of pallets; an elevator for receiving empty pallets from the pallet tower and loaded pallets from the charging station and being vertically freely movable during loading of the pallets in the charging station; a conveyor for moving the transporting pallets between the elevator and the charging station for transferring empty pallets from the elevator to the charging station and for transferring loaded pallets from the charging station to the elevator; and a positioning arrangement for placing the elevator into such a position during transfer thereto of empty pallets from the pallet tower and transfer therefrom of loaded pallets into the pallet tower that a transfer of loaded pallets into the transporting pallet is performable at the same location where the pallets are removed from the transporting pallet.

16 Claims, 9 Drawing Sheets

APPARATUS AND TRANSPORTING UNIT FOR CONVEYING INJECTION-MOLDED ARTICLES AWAY FROM AN INJECTION MOLDING MACHINE

BACKGROUND OF THE INVENTION

This invention relates to an apparatus for transporting injection molded articles away from an injection molding machine on pallets which, after their removal from a pallet tower are loaded with the articles in a charging station in the region of the injection molding machine. Thereafter the loaded pallets are moved from the charging station back to the pallet tower which has an elevator that travels vertically along frame elements of the pallet tower and which may be freely movable, as needed, during the loading operation. The elevator supports transporting pallets, and one or more pallets may be coupled to a transporting pallet to form a transporting unit therewith. The elevator is adapted to receive at least two transporting units. The invention also relates to such transporting units formed of a transporting pallet and at least one pallet which is connected, as needed, with the transporting pallet and which may be disconnected from the transporting unit for charging the same with injection-molded articles produced by the injection molding machine.

In a known apparatus of the above-outlined type, as disclosed, for example, in U.S. Pat. No. 5,024,593 issued to Karl Hehl on Jun. 18, 1991, the articles discharged by the injection molding machine are placed in pallets which are situated in a charging station. These pallets are readied in a pallet tower in transporting units, and the empty pallets are taken from a transporting unit while the loaded pallets are added to another transporting unit. Each transporting unit comprises a transporting pallet on which a plurality of stackable pallets are interconnected to form a stacked unit. The loaded transporting units are transferred by a transferring device onto a linearly travelling transporting vehicle which moves parallel to the vertical symmetry plane of the injection molding machine. The transporting vehicle is furthermore so constructed that it is also able to support machine replacement parts in such a manner that simultaneously a container for the injection molded articles and an injection molding tool may be transported. For the removal of the pallets from the pallet tower and for the transfer of the loaded pallets into the pallet tower, however, a substantial and complex programming and structural arrangement are necessary since the pallets to be introduced into the charging station have to be separated by means of several vertical displacements of the elevator. This may cause undesired timing conflicts during the replacement of the pallets.

Further, JP-OS 57-184001 (Patent Abstracts of Japan, Volume 7, Issue 29 (M-191), 1174) and JP-OS 60-262776 (Patent Abstracts of Japan, Volume 10, Issue 142 (M-481), 2199) disclose transport carriages in which individual article containers are supported on support plates and in which injection molding tools are individually received in such a manner that they may be taken off for further processing by means of a horizontal movement. In either case, however, the supports for the injection-molded articles or, as the case may be, the tool components are situated at fixed, unchangeable distances which makes difficult an optimal utilization of the available conveying space as a function of the size of the injection-molded articles or, as the case may be, the injection tool components.

In the apparatus disclosed in the above-noted JP-OS 57-184001 reference, the article containers are pulled out of the transporting carriage by a hydraulic device and are thereafter continuously charged with the injection-molded articles supplied thereto. In order to effect such a continuous charging, underneath the supplied articles the article container is gradually pushed back into the transporting carriage so that during the charging operation the transporting carriage may not execute a free motion. As soon as the container is charged, a gate interrupts further supply of the injection-molded articles until the transporting carriage is displaced vertically, a new pallet is taken, and the latter has been moved into the initial position. Such a construction leads to undesired interruptions because, on the one hand, a continuous charging of the pallets, particularly when a removal device is used, is not possible and, on the other hand, during the replacement of the transporting carriage there is a significant delay until the new transporting carriage is again in a ready position.

U.S. Pat. No. 4,687,403, particularly as shown in FIGS. 2-5, discloses a substantially complex arrangement for taking individual pallets from a pallet stack by means of several vertical displacements of an elevator. In such a process the pallet stack is subdivided into two substacks so that from one substack the empty pallets are taken and after their charging they are added to the other substack. Upon consuming an entire pallet stack, the full pallet stack is pushed out of the apparatus and readied for transportation without the presence of corresponding transporting pallets.

JP-OS 63-1632 discloses a stacking device in which the stacked pallets are supported in an essentially two-dimensional carrier frame which is formed of two vertical frame elements connected to one another by a horizontal frame element.

SUMMARY OF THE INVENTION

It is an object of the invention to provide an improved apparatus as well as a transporting unit of the above-outlined type in which the periods required for replacement of the pallets as well as the transporting units formed of one or more pallets is minimized without increasing the complexity of the programming.

This object and others to become apparent as the specification progresses, are accomplished by the invention, according to which, briefly stated, the transporting apparatus for moving away injection-molded articles from an injection molding machine includes pallets; a charging station for loading the pallets; transporting pallets each individually supporting at least one pallet and coupled thereto for forming a transporting unit; a pallet tower spaced from the charging station for storing a plurality of pallets; an elevator for receiving empty pallets from the pallet tower and loaded pallets from the charging station and being vertically freely movable during loading of the pallets in the charging station; a conveyor for moving the transporting pallets between the elevator and the charging station for transferring empty pallets from the elevator to the charging station and for transferring loaded pallets from the charging station to the elevator; and a positioning arrangement for placing the elevator into such a position during transfer thereto of empty pallets from the pallet tower and transfer therefrom of loaded pallets into the pallet tower that a transfer of loaded pallets into the transporting pallet is performable at least at the same location where the pallets are removed from the transporting pallet.

According to the invention as outlined above, the pallets can be taken in the simplest way from the transporting unit and may be admitted to the latter after loading. In particular, for performing a pallet replacement, the vertical motions of the elevator required heretofore are no longer necessary so that the pallet exchange may take place very rapidly, usually within seconds, that is, well within the duration of one injection cycle. During the charging of the pallets the elevator is vertically freely movable so that the admission of transporting units with empty pallets as well as a removal of a transporting unit with loaded pallets is feasible at each level. Consequently, a particular, separate hoisting arrangement at the transporting vehicle is not required. Further, even in case of the most unfavorable replacement conditions of the transporting unit in the pallet tower, the idle period is reduced by the fact that it is in principle possible to take out any desired empty pallet, independently from whether it is situated in the transporting unit at the top, at the bottom or in the middle.

According to an advantageous feature of the invention, the frame of the pallet tower has two frame elements which define a substantially vertical plane and which are supported on the injection molding machine in an orientation perpendicular to the axis of injection. Such a two-dimensional construction of the pallet tower frame increases the coupling possibility to a transporting vehicle, because the pallets may be transferred to the transporting vehicle either parallel or perpendicularly thereto. Particularly in large systems which encompass a plurality of injection molding machines the available space may be optimally utilized in this manner.

According to a further feature of the invention, the elevator is movable vertically by means of a spindle-type hoisting device supported on the pallet tower frame. The spindle nut of the hoisting device is affixed to the elevator and it threadedly engages the rotatable hoisting spindle. The spindle motor is arranged in a horizontal orientation, substantially in a vertical projection of the frame of the pallet tower. By virtue of this arrangement the space underneath the transporting unit may be utilized for a direct, immediate transfer onto the transporting vehicle.

In accordance with another feature of the invention, on the pallet tower frame signal transmitters are arranged, the number of which corresponds to the greatest possible number of pallets in the transporting unit and whose distance from one another corresponds to the minimum height of a pallet. Further, the pallets are provided with bar codes which are scanned by reader sensors situated at the charging station. This arrangement further reduces the complexity of the programming. Thus, as required, sensors are used which, on the one hand, recognize how many pallets per transporting unit are provided and, on the other hand, recognize upon introduction of the pallets into the charging station whether the pallet in question is at all adapted to receive injection-molded articles delivered by the injection molding machine. In this manner the probability of operational disturbances is further reduced.

According to a further feature of the invention, the transporting units, while of equal height, contain different numbers of pallets and the transporting pallets are supported at such a mutual distance which at least equals the height of a transporting unit. By virtue of this arrangement there is feasible an adaptation of stacked pallets of different heights for injection-molded articles of different sizes while standardized transporting units of identical magnitudes are being formed.

In accordance with a further feature according to the invention, the transporting means conveying the transporting units is a transporting vehicle arranged for carrying injection molding tools and further, the transporting pallets each have a supporting surface having a configuration that is complemental to the configuration of that surface portion of the injection molding tool which is intended to lie on the supporting surface of the transporting pallet. By virtue of this arrangement the transporting units may be conveyed with the same transport vehicle that carries the injection molding tools (including, for example, the plasticizing cylinder) during tool replacement. The transfer onto the transporting vehicle may be effected actively or passively such that, for example, the transporting vehicle directly takes over the loaded transporting units underneath the pallet tower.

According to the invention, a transporting unit is formed of a transporting pallet and at least one pallet which is connected to the transporting pallet and which is separable from the transporting pallet for charging the pallet with injection-molded items discharged by the injection molding machine. The transporting pallet has carrier elements for the coupling of pallet guides whose number depends from the pallet height for individually supporting the pallets. By virtue of this construction of the transporting unit, even in case of the least favorable replacement conditions, the idle periods are reduced by the fact that in principle it is possible to take any desired empty pallet, similarly to a drawer from a chest, independently of whether such pallet is situated in the transporting unit at the top, at the bottom or in the middle. Dependent upon the size of the injection molding tool component, the number of pallets per transporting unit may be optimized for a better utilization of the transporting unit which at the same time reduces the load on the transporting vehicle by readying the empty pallets and moving away the loaded pallets.

According to a further feature of the invention, the carrier elements are vertically oriented and, as required, may be taken from the coupling elements of the transporting pallet. By virtue of such an arrangement, the transporting pallet may be adapted, on a modular principle, for receiving only a large pallet or for receiving several pallets. If one large pallet is to be received, the vertical carrier elements of the transporting pallets are simply removed as required.

In accordance with a further feature of the invention, the pallet proper is held in a supporting pallet which is guided on pallet guides affixed to free-standing vertical carrier elements, and the supporting pallet has a coupling element for the carrier pin of the chain of a drive mechanism. By virtue of such an arrangement the handling of the pallets is independent from the pallet size.

In accordance with a further feature of the invention, each transporting pallet has a supporting surface configuration that corresponds to a surface configuration of the injection molding tool to be transported. The supporting surface is formed by two parallel guide rails connected by means of at least one transverse web. The guide rails have a cross-sectional configuration which corresponds to the cross-sectional configuration of the support plates of the transporting vehicle for a mold replacement. At least one guide rail of the transporting pallet has at least one transverse groove into which a carrier element of a transport chain of the transporting vehicle is introducible. By virtue of such a structural arrangement, the transporting units may be carried with the same transporting vehicle as the injection molding tools during replacement of such tools.

According to a further feature of the invention, on the supporting pallet coding lugs are provided for pallet identification. By virtue of this feature, it is determinable how many pallets per transporting unit are provided and whether the pallet is at all adapted to receive injection-molded articles discharged by the injection molding machine. In this manner, the risk of disturbances is further reduced.

DESCRIPTION OF THE PREFERRED EMBODIMENTS

Figure 1:
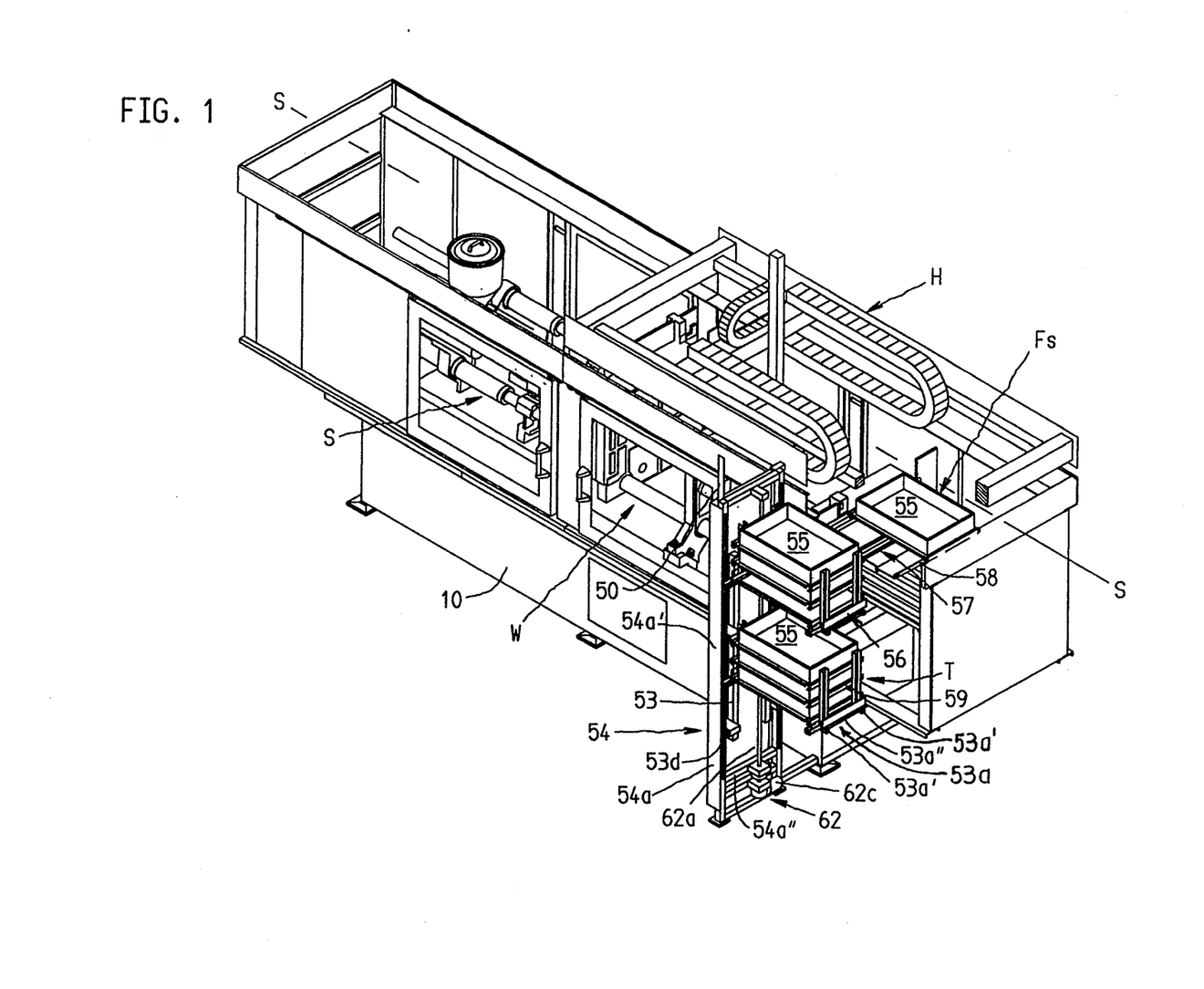
FIG. 1 is a schematic perspective view of an injection molding machine, including a charging station situated within the base outline of the machine for loading injection-molded articles into a container.
Figures 2, 2A:
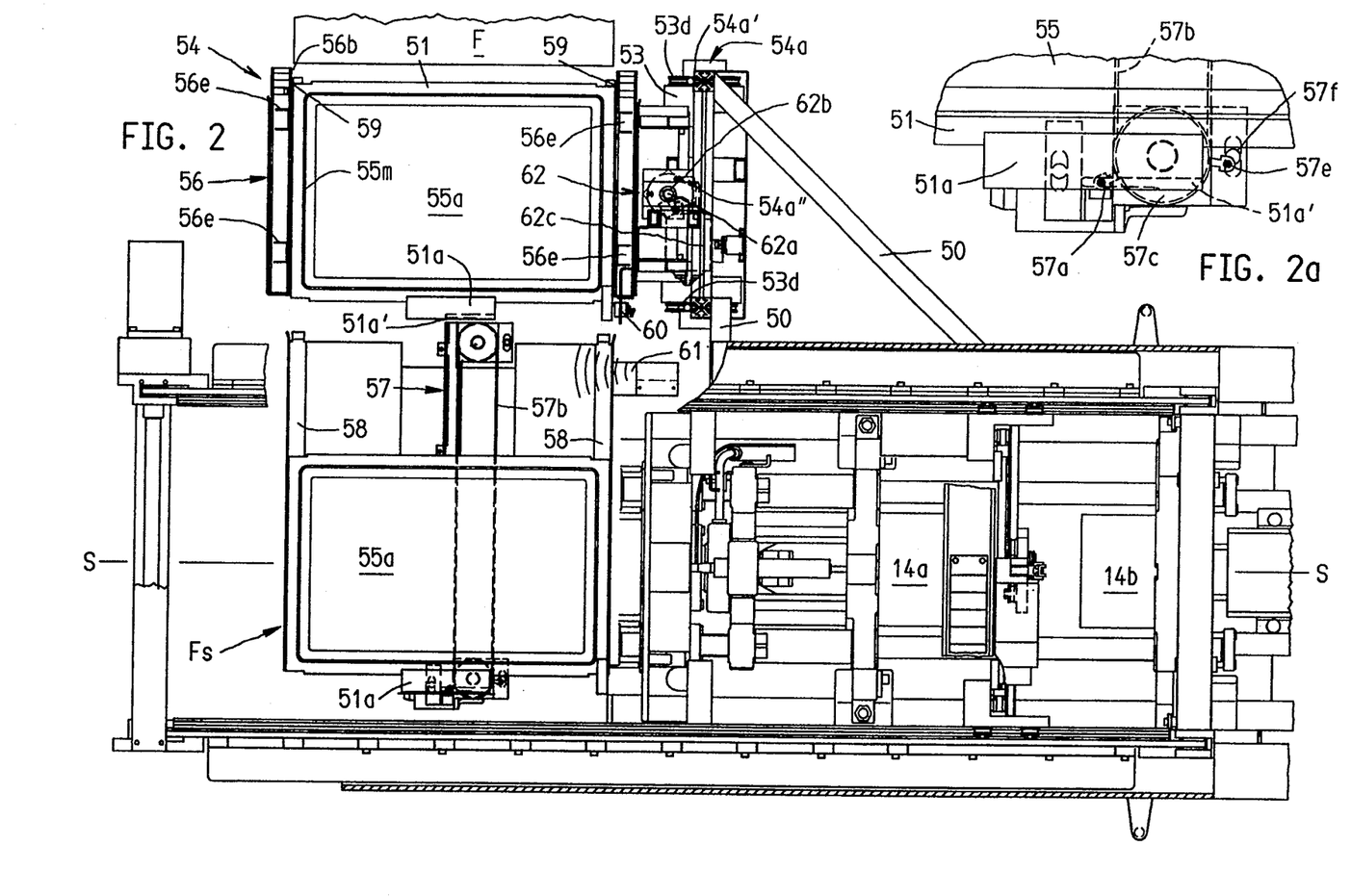
FIG. 2 is a top plan view, on an enlarged scale, of the structure shown in FIG. 1.
FIG. 2a is an enlarged fragmentary top plan view of a detail of FIG. 2.
Figure 3:
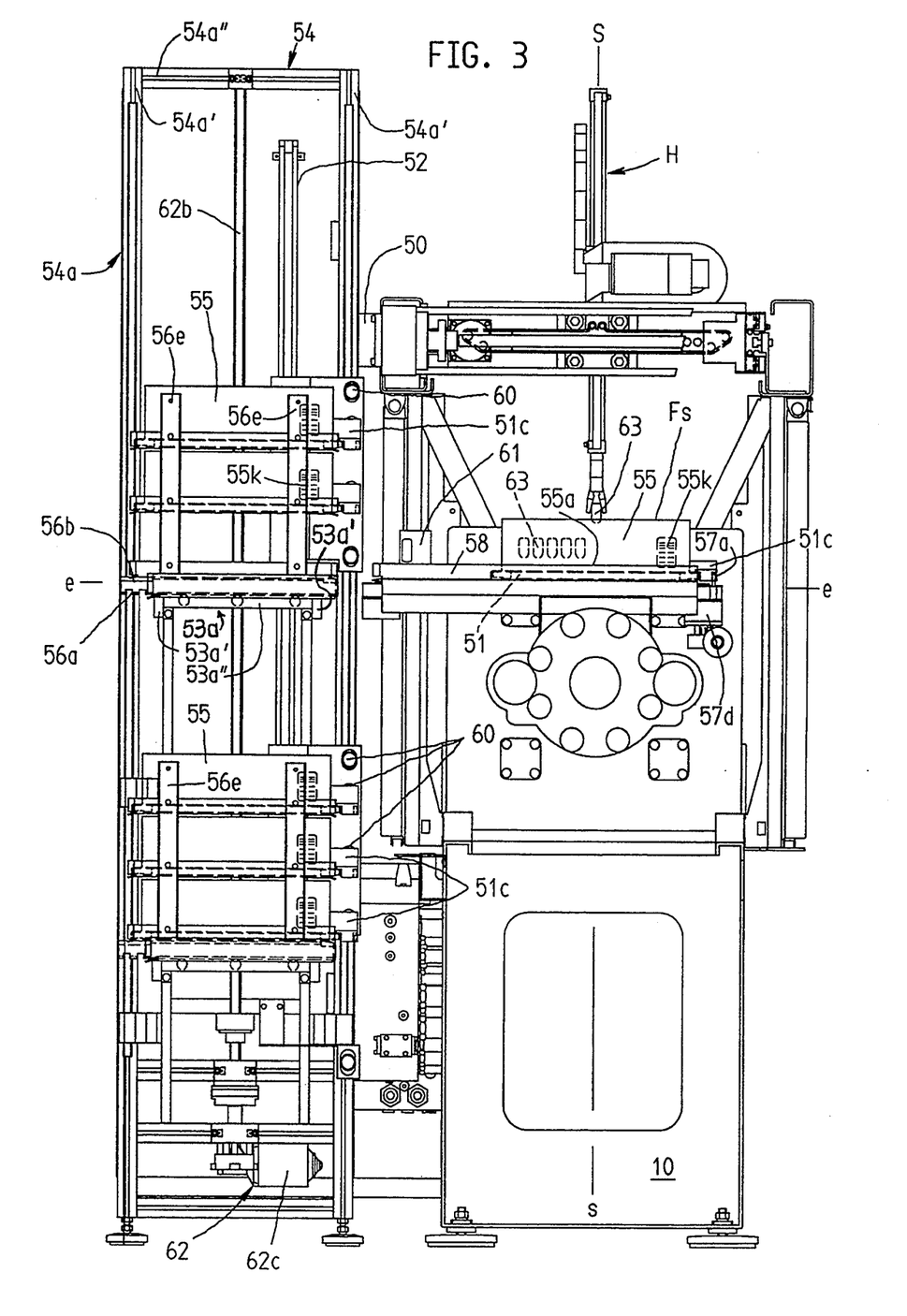
FIG. 3 is a front elevational view of the construction shown in FIG. 2.

Turning to FIGS. 1, 2 and 3, the injection molding machine with which the apparatus according to the invention is associated has a horizontally oriented injection molding unit S and an adjoining, horizontally oriented mold closing unit W. Both units S and W are supported on a machine stand 10.

Figure 4:
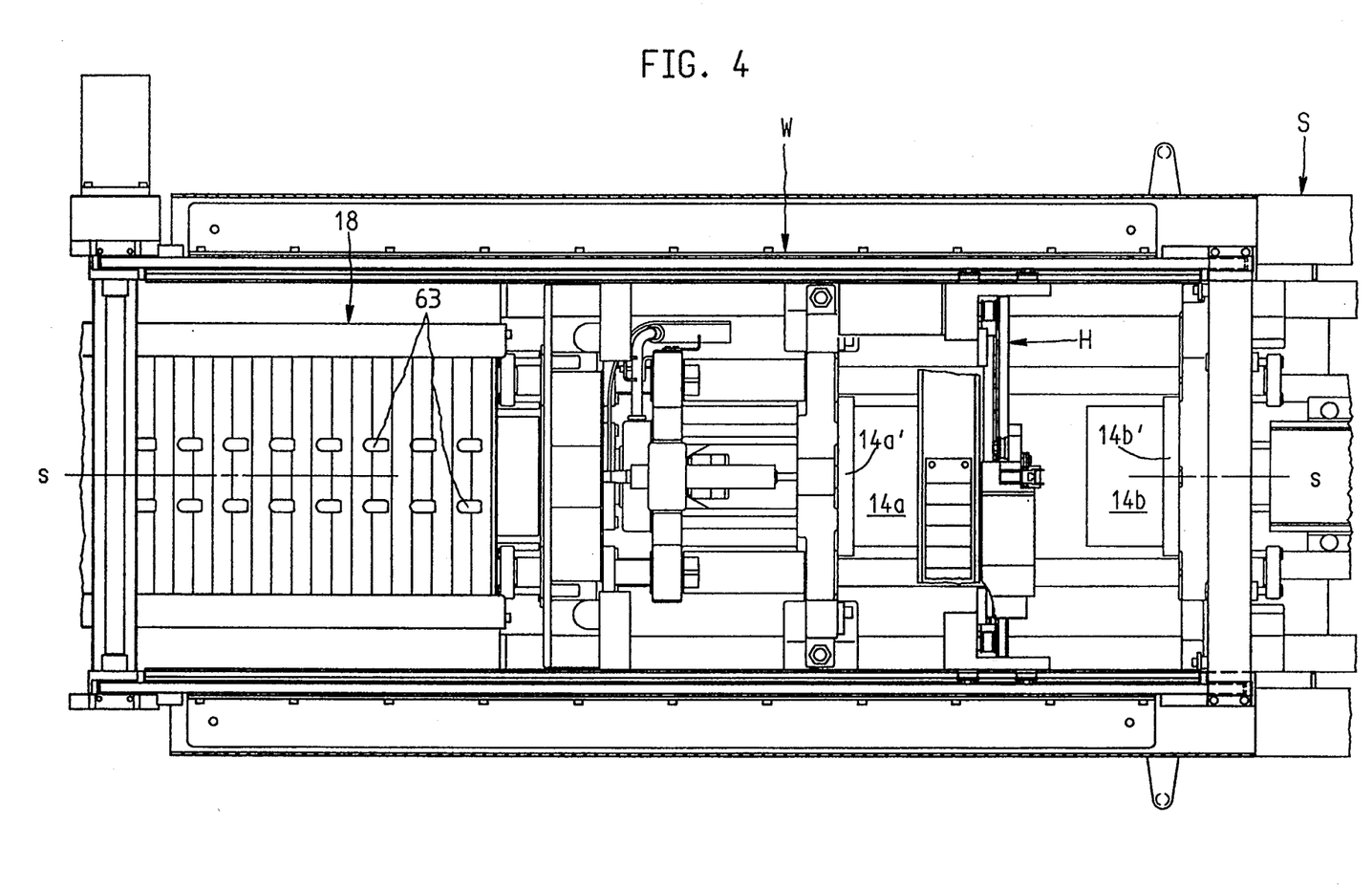
FIG. 4 is a top plan view of a variant of the apparatus shown in FIGS. 1 and 2, wherein the charging station is situated externally of the outline of the injection molding machine.
Figure 5:
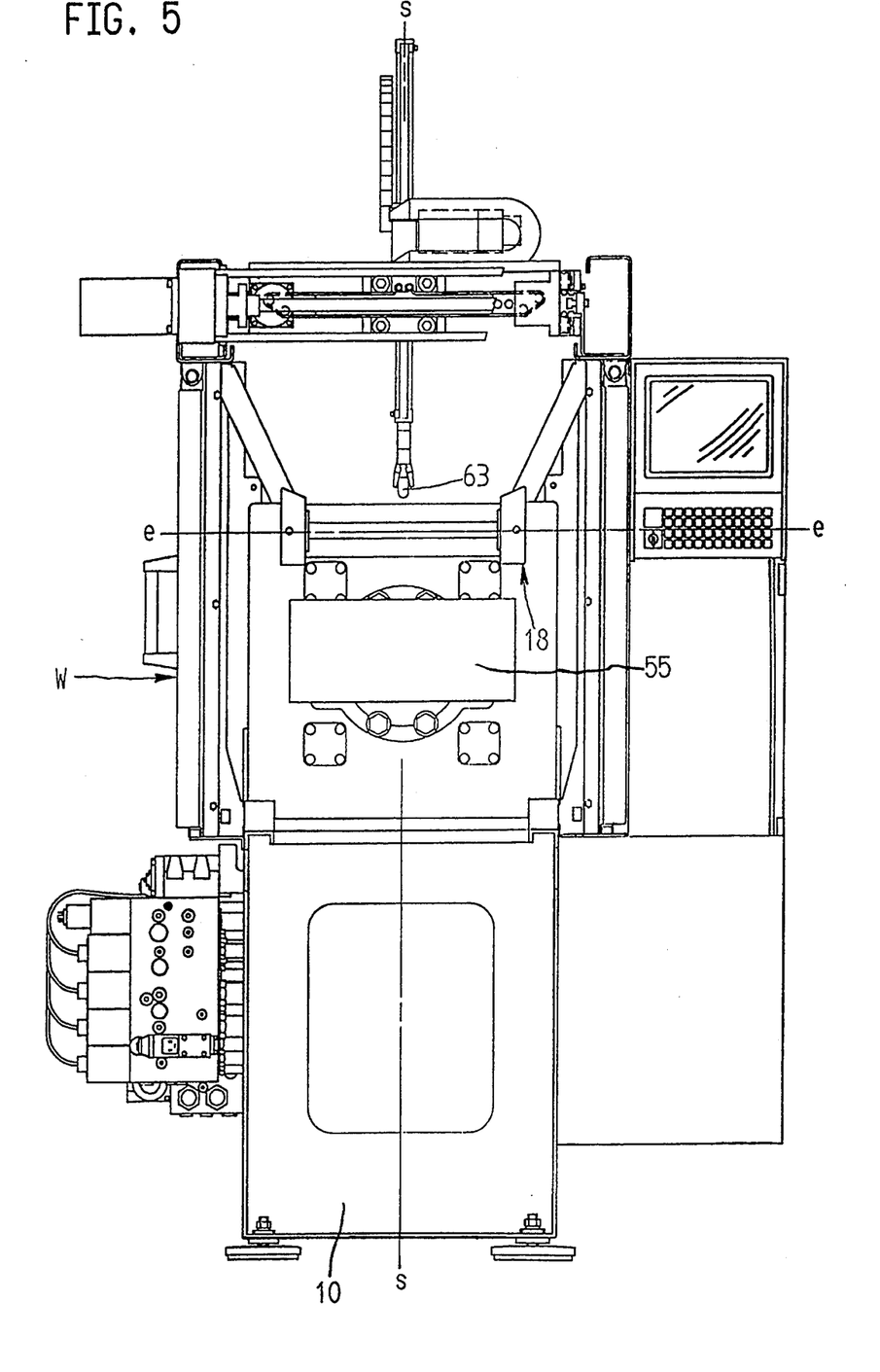
FIG. 5 is a front elevational view of the structure of FIG. 4.
Figure 6:
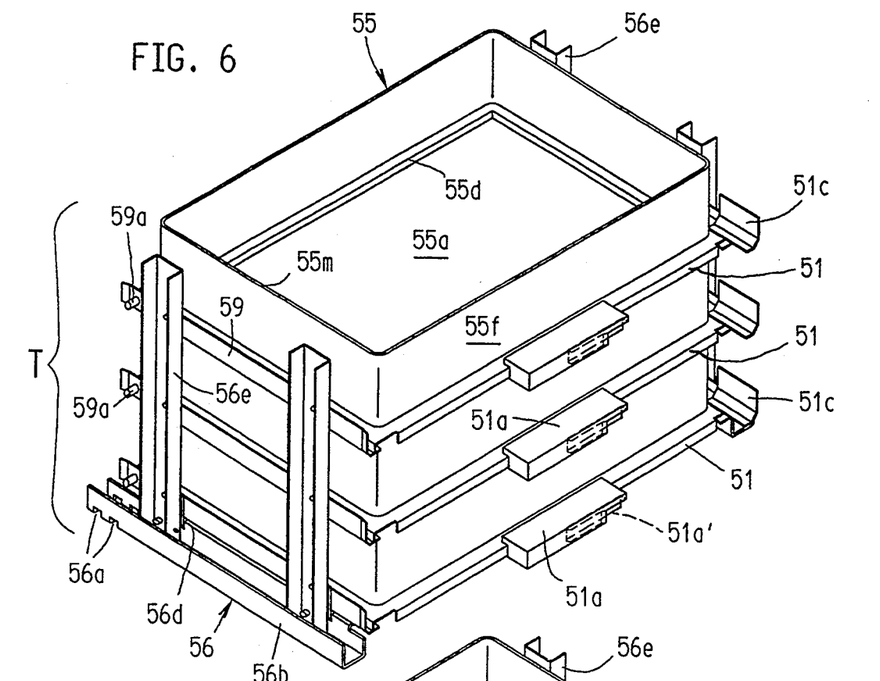
FIG. 6 is a perspective view of a transporting unit supporting a plurality of stacked pallets.
Figure 7:
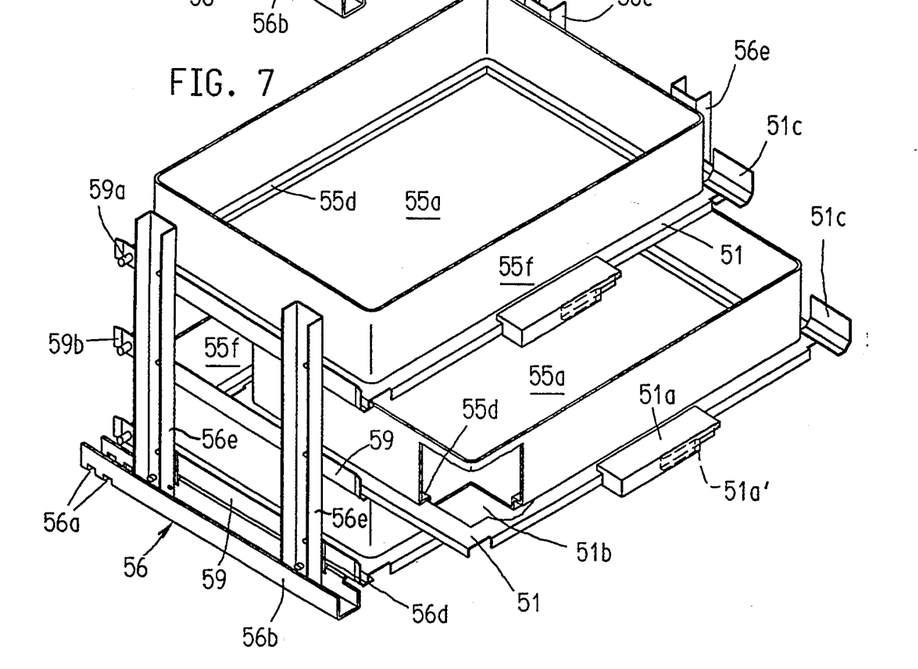
FIG. 7 is a view similar to FIG. 6 except that one of the pallets in the stack is partially pulled out.
Figure 8:
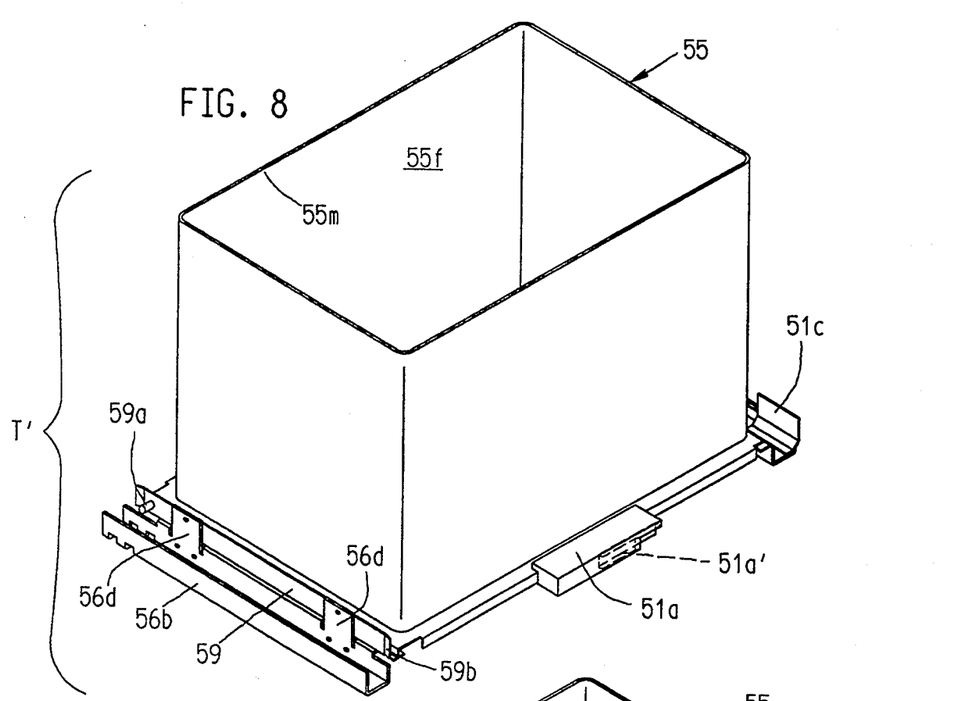
FIG. 8 is a perspective view of a transporting unit supporting a single tall pallet.
Figure 9:
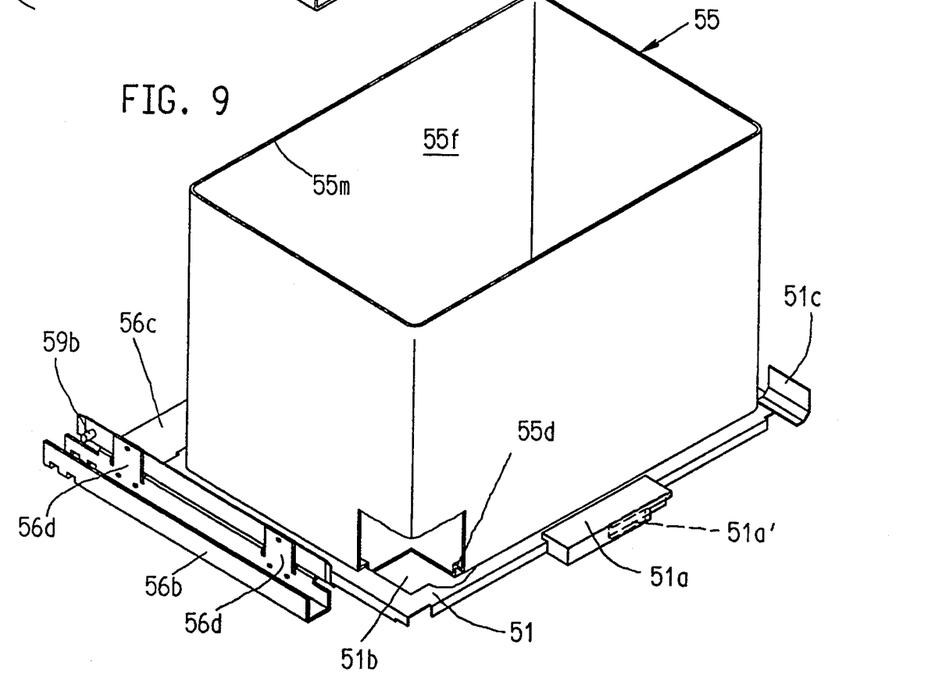
FIG. 9 is a view similar to FIG. 8 showing the pallet in a partially pulled-out position.

The injection-molded articles 63 made during the injection molding process are carried away from the injection molding machine on pallets 55 which are charged with the articles 63 in a charging station Fs in the zone of the injection molding machine. The charging station Fs may be situated within the base outline of the injection molding machine as shown in FIGS. 1, 2 and 3 or may be positioned externally thereof, at the front end which bounds the mold closing unit W, as illustrated in FIGS. 4 and 5. In the former case, each pallet 55 is charged with articles 63 by means of a removal device H which advances the articles from the opened injection mold and deposits them into the appropriately positioned pallet 55. In this operation the articles are deposited in the pallet 55 in rows transversely to the vertical symmetry plane s—s of the injection molding machine by a cyclically moving gripper of the removal device H. The articles 63 are immobilized in depressions (nests) 55g provided in the pallets 55. In the embodiment of FIGS. 4 and 5, where the charging station Fs is situated externally of the injection molding machine, each pallet 55 is charged by means of a conveyor belt 18 which advances the injection-molded articles parallel to the symmetry plane s—s. The conveyor belt 18 is, in turn, charged with articles by the gripper of the removal device H. It is, however, also feasible to charge the pallets by means of a conveyor belt which receives the articles directly as they drop from the opened mold, as shown in FIG. 5.

The pallets 55 are so structured that they may be assembled into a stacked unit under mutual centering. The pallets are held in readiness prior to performing the charging operation in the charging station Fs by being individually supported in a pallet tower 54, as shown, for example, in FIGS. 1 and 2. The pallet tower 54 is situated between the charging station Fs and a further transporting means such as a transporting vehicle F (FIG. 2) or a roller track and is situated at the front end of the injection molding machine, externally of its base outline. The pallet tower 54 is supported on the ground and projects upwardly beyond the top of the injection molding machine.

An elevator 53 is movable vertically by means of rollers 53d on vertical frame elements 54a' of the frame 54a of the pallet tower 54. The elevator 53 is designed for accommodating at least two transporting units T, T'. The elevator 53 which may be freely movable during the charging process is situated during the removal of a pallet 55 from and during the return of a loaded pallet 55 to the pallet tower 54 in a position which permits a transfer of the loaded pallet into that space of the transporting unit T, T' from which the empty pallet 55 has been previously taken out. The transfer of the empty pallets 55 into the charging station Fs for loading is effected solely by a horizontal motion. Before initiating such a displacement, the elevator 53 is situated, after a vertical motion monitored by a path sensing device 52, in a position in which pallet guides 59 of the respective transporting unit adjoin pallet guides 58 of the charging station Fs. After charging, the pallets 55 are again joined with a transporting pallet 56 to form a transporting unit which thereafter can be transferred to or from the transporting vehicle F.

A driving mechanism 57 which moves the pallets in a horizontal direction without the need for a further motion of the elevator 53, includes an endless chain 57b which is situated underneath the pallet 55 positioned in the charging station Fs. A carrier pin 57a of the chain 57b is, as a result of a semicircular motion about a sprocket wheel 57c coupled with a support plate 51 by extending into a transverse groove 51a' of a coupling element 51a of the support plate 51. The support plate 51 slides on the pallet guides 59 of the transporting unit and carries in a recess 51b the respective pallets 55 so that desired pallets may be associated with the respective support plates 51. While the pallets 55 themselves could be guided directly on the pallet guides 58, 59, this would contribute significantly to a wear of the pallets. Such a wear can be avoided by the interposition of the support plates 51. As seen in FIGS. 2 and 3, the endless link chain 57b of the driving mechanism 57 is oriented in a horizontal plane. The carrier pin 57a is, as particularly well seen in FIG. 2a, secured to the chain links in such a manner that it projects outwardly beyond the chain and thus describes a circle of greater radius than the chain-supporting sprocket wheel 57c. The coupling proper is effected by laterally guiding the carrier pin 57a into the transverse groove 51a'. In order to avoid unnecessary displacements of the chain during the transporting motion, switching elements 57e are mounted on the chain which stop the motion of the chain as they approach a limit switch 57f, as shown in FIGS. 2 and 2a.

Also referring to FIG. 3, the frame 54a of the pallet tower 54 is formed of two frame elements 54a' which are arranged in an approximately vertical plane and which are connected with one another by horizonal frame elements 54a''. The pallet tower 54 is connected with the injection molding machine by means of a plurality of support elements 50. The essentially planar configuration of the frame permits a rearward as well as a lateral attachment of a transporting vehicle F to the injection molding machine. Such an attachment possibility is further ensured by the fact that a hoisting spindle device which is provided for raising and lowering the elevator 53, is essentially arranged within the vertical projection of the frame 54a. A nut 62b affixed to the elevator 53 is threadedly inserted on the rotating threaded spindle 62a of the hoisting spindle device, and the spindle 62a is, at the top and at the bottom, articulated to the tower frame 54a. To avoid disturbing the space-saving arrangement of the tower frame 54a, the motor 62c of the hoisting spindle device is arranged substantially within the vertical projection of the frame 54a in a horizontal orientation and drives the spindle 62a by means of a gearing.

In order to ensure a sufficient mobility of the elevator 53 in the pallet tower 54, the latter is at least twice as high as the elevator 53. The elevator 53 is capable of accommodating at least two transporting units T, T' in a superposed relationship. As shown in FIGS. 1 and 3, the elevator 53 proper has two receiving forks 53a for the transporting unit. The receiving forks 53a are formed by two parallel rails 53a' connected to one another by means of at least one transverse web 53a''. The receiving forks 53a and thus also the transporting pallets 56 of the transporting units T, T' are always situated at a mutual distance from one another which is not less than the height of one transporting unit. By "transporting unit" there is meant a unit formed of a transporting pallet 56 with a varying number of pallets 55 which, however, insofar as possible, have the same external dimensions. For sensing the number of pallets 55 accommodated in one transporting unit, on the frame 54a of the pallet tower 54 signal transmitters 60 are arranged whose number corresponds to the greatest possible number of pallets 55 in the transporting unit T, T' and whose mutual distance from one another corresponds to the minimum height of one pallet 55. For further securely sensing the pallets, on each pallet 55 a bar code 55k is provided. By means of a reading diode 61 situated at the charging station Fs the type of pallet may be sensed and thus it may be assured that the receiving trays 55g of the pallets correspond to the configuration of the injection-molded articles 63.

Figure 10:
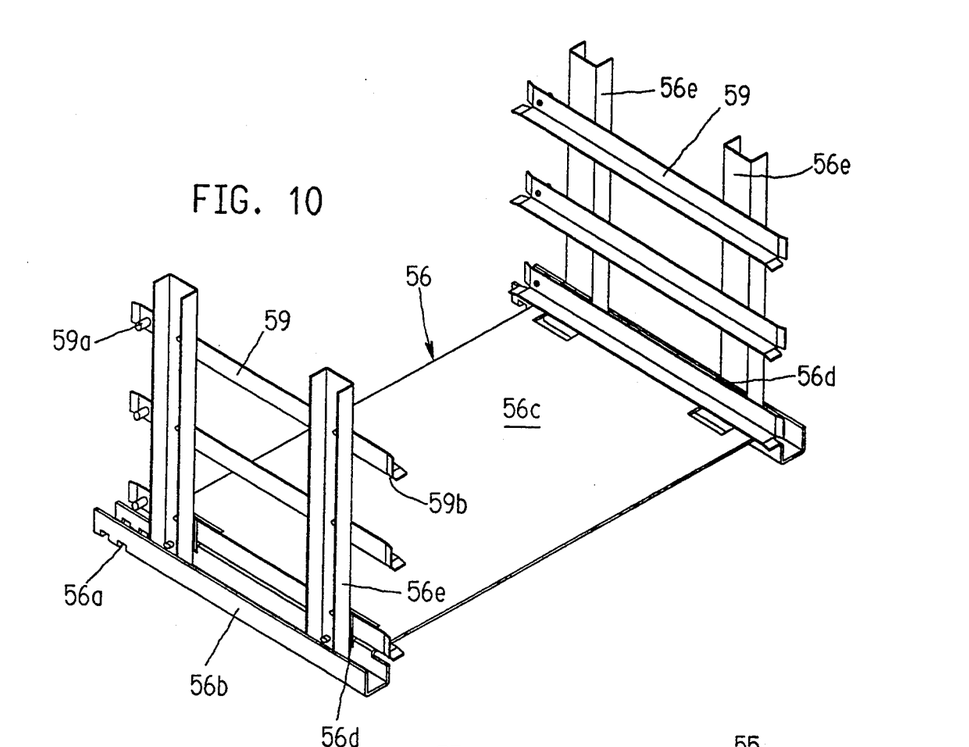
FIG. 10 is a perspective view of a transporting pallet as shown in FIGS. 6 and 7, without support plates and pallets.

Turning in particular to FIG. 10, the transporting pallet 56 itself is formed of two guide rails 56b which are connected by a transverse plate member 56c. This base element has an upwardly oriented receiving configuration which corresponds to the configuration of the downwardly oriented area of the injection molding tool 14a, 14b (FIGS. 2 and 4). Also, the cross-sectional profile (configuration) of the guide rails 56b corresponds to the cross-sectional profile of the support plates 14a', 14b' of the injection molding tool 14a, 14b which is to be transported on the transporting vehicle F during a mold replacement operation. The transporting vehicle F itself which is only schematically shown in FIG. 2 is described in detail in U.S. Pat. No. 4,737,095, issued to Karl Hehl on Apr. 12, 1988. The transporting vehicle F selectively carries injection molding tools or transporting units and thus opens the way to possibilities of significantly rationalizing the transport system associated with the injection molding machine. Based on structural preconditions, a transfer mechanism of the transporting vehicle may actively remove the transporting unit from the pallet tower or may insert the transporting unit into the tower from the back or laterally. It is to be understood that other embodiments are also feasible where the transporting vehicle merely passively takes over the corresponding transporting units. In case of an active transfer as shown in the embodiment described, on the guide rails 56b transverse grooves 56a are provided into which a carrier element of a transport chain on the transport vehicle F may be guided. The base element which is formed of sheet metal that is bent and stamped and which comprises interconnected guide rails and a transverse sheet metal member is constructed for modular assembly. For this purpose, coupling elements 56d are provided to which, as required, vertical carrier elements 56e may be attached. At a desired height of these carrier elements 56e, dependent upon the pallet height, a required number of pallet guides 59 may be arranged, whereby a great flexibility with respect to pallet sizes may be achieved.

By virtue of the above-described construction, the pallets 55 which are each individually supported in the transporting unit T, T', are secured by carrier elements in the direction of the injection axis s—s. A securement, however, is present also perpendicularly to this direction by spring-biased locking elements 59a which may be locked into detent openings 51d. This connection, however, is released by the drive mechanism upon horizontal motion of the pallet. Further, the pallet guides 59 and the pallet guides 58 have angled terminal regions (designated at 59b for the pallet guides 59) which permit a smooth transfer from the pallet tower 54 into the charging station Fs and conversely.

Figure 11:
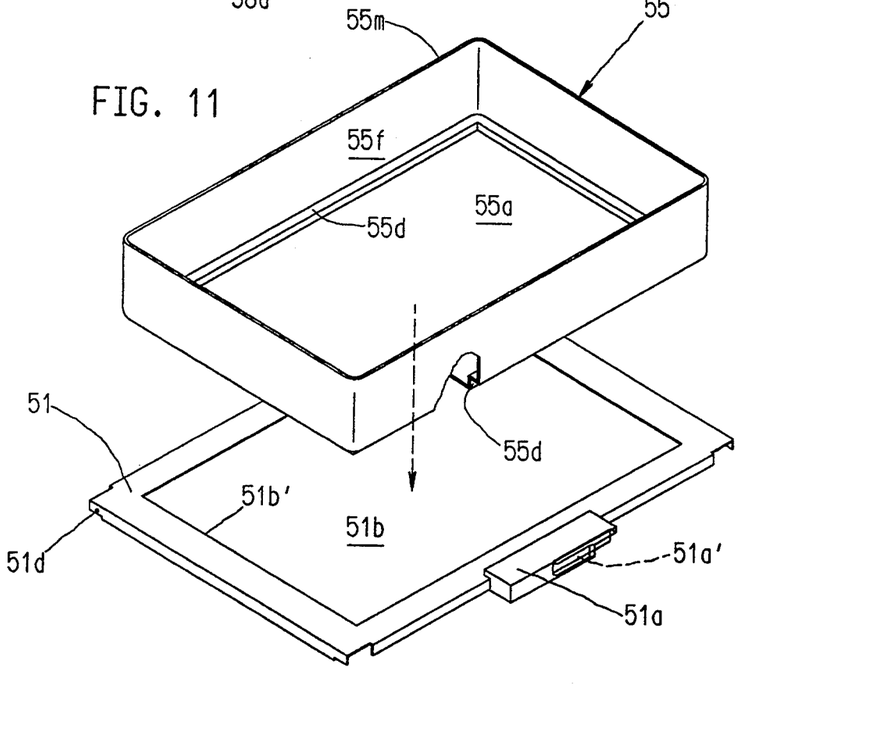
FIG. 11 is a perspective view of a support plate and an associated pallet.
Figure 12:
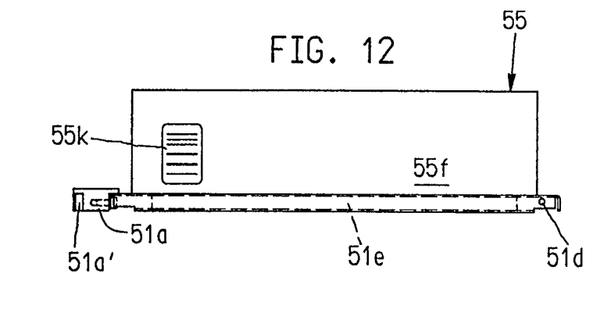
FIG. 12 is a side elevational view of a support plate with a pallet received thereon.
Figure 13:
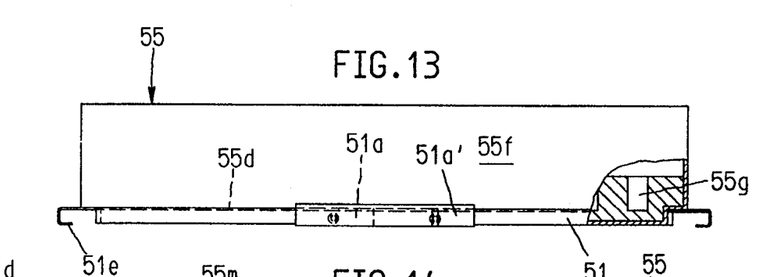
FIG. 13 is a front elevational view of the structure shown in FIG. 12.
Figure 14:
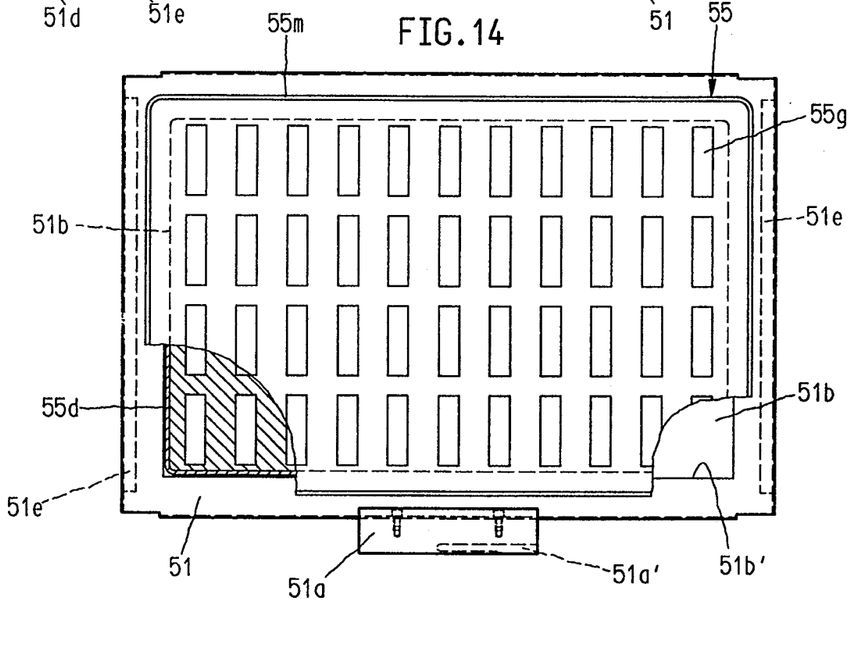
FIG. 14 is a top plan view of the structure shown in FIGS. 12 and 13.
Figure 15:
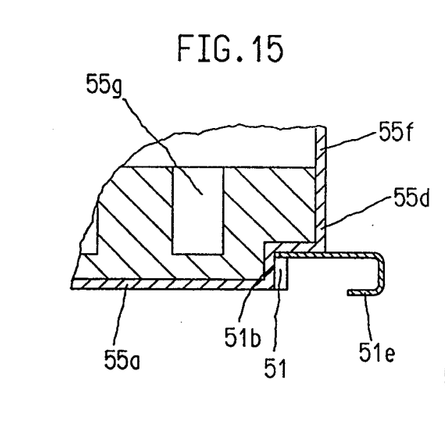
FIG. 15 is an enlarged fragmentary sectional front elevational view of a detail shown in FIG. 13.

The bottom 55a which has the support trays 55g is surrounded by a vertical protective wall 55f. To ensure that the pallets may be readily stacked, the outline of the bottom 55a is, as shown in FIGS. 11-15, smaller than the outline of the protective wall 55f. The pallets are supported on the support plates 51 at their central region 55d. For this purpose, in the support plates 51 openings 51b are provided which correspond to a respective central region. Furthermore, the pallets 55 may be stacked externally of the pallet tower 54 and the transporting unit in a space-saving manner. Therefore, the pallet is not supported itself on the transporting pallet 56 directly but with the intermediary of the support plate 51, and the contour 51b' of the opening 51b of the support plate 51 corresponds to the upper edge 55m of a pallet 55 (FIG. 11). As needed, for recognizing the pallets or for recognizing the pallet height of the pallets situated in the transporting unit, coding lugs 51c are provided on the support plate 51 which are scanned and recognized by the signal transmitters 60. For this purpose, the slide rail 51e too, is somewhat set back at its edge regions.

The charging station Fs arranged within the outline of the injection molding machine according to the embodiment shown in FIGS. 1, 2 and 3 may easily be converted into the variant shown in FIGS. 4 and 5 in which the charging station is situated externally of the outline of the injection molding machine. In such a variant the charging station is situated in front of that end of the injection molding machine which adjoins the mold closing unit W. The assembling operation to perform a conversion is limited in essence in that instead of the pallet guides 58 an endless conveyor belt 18 is installed at the same height level in the injection molding machine, so that the injection-molded articles may be deposited directly on the conveyor belt 18. In this manner, the pallet guide 58 is situated approximately in the same horizontal plane e—e (FIG. 3) as the conveyor surface of the conveyor belt 18, and the height of the plane e—e is situated approximately at the height of the upper edge of the injection molding tool 14a, 14b.

By virtue of the fact that the pallets are individually supported in the transporting unit, the pallets may be easily pulled out of the respective transporting unit independently from other pallets forming part of the same transporting unit. Thus, similarly to a cabinet where the drawers may be pulled out or pushed back individually from one another in a desired sequence, the pallets may be manipulated in a desired sequence which occurs preferably from above downwardly or from below upwardly. The charging of the pallets is effected in such a manner that first one pallet is pulled out of the transport unit T, T', then it is loaded in the charging station Fs and thereafter, at the same location, it is returned to the transporting unit.

Thereafter, the elevator 53 is lowered or raised until the consecutive pallet is in a ready position. During the charging of a pallet the elevator 53 may be vertically freely displaced, because there are no interfering coupling elements or pallet parts which would remain in a space required for such a vertical travel of the elevator. Thus, during the charging of a pallet, there can be performed a removal of a loaded transporting unit and a transfer of an empty transporting unit. By providing the possibility of such free vertical motion for the elevator 53, the transporting vehicle F needs no hoisting device at all, because the elevator 53 has sufficient time to move the loaded transporting unit to a transfer level for the transporting vehicle F.

It will be understood that the above description of the present invention is susceptible to various modifications, changes and adaptations, and the same are intended to be comprehended within the meaning and range of equivalents of the appended claims.

What is claimed is:

1. A transporting apparatus for moving items to or from an injection molding machine, comprising (a) a plurality of transporting units each including a transporting pallet and a selected number of pallets removably accommodated on said transporting pallet; each said transporting pallet including pallet guides for individually supporting the selected number of pallets and carrier elements including means for coupling thereto a selected number of superposed pallet guides dependent upon height dimensions of the selected number of pallets;
(b) a charging station;
(c) charging means for loading the pallets in the charging station with the articles produced by the injection molding machine; the articles being comprised in the items;
(d) a pallet tower spaced from the charging station for storing a plurality of pallets; said pallet tower including frame elements forming a frame;
(e) an elevator for receiving pallets from said pallet tower and pallets from said charging station; said elevator being vertically freely movable during loading of the pallets in the charging station; said elevator including means for accommodating at least two of said transport units above one another;
(f) means transferring pallets from said pallet tower and said charging station to said elevator; and
(g) conveying means for moving the transporting pallets between the elevator and the charging station for transferring pallets from said elevator to said charging station and for transferring pallets from the charging station to said elevator.

2. The transporting apparatus as defined in claim 1, wherein said pallet tower has a height which is minimum twice a height of said elevator; further comprising receiving forks supported on said elevator for handling said transporting units; each receiving fork including two parallel rails interconnected by a transverse member.

3. The transporting apparatus as defined in claim 1, further comprising signal transmitters supported on said frame of said pallet tower; the number of said signal transmitters being equal to a maximum number of the pallets in the transporting unit; said signal transmitters being at a mutual distance from one another that corresponds to a minimum height of a pallet; bar codes provided on said pallets and sensor means supported at said charging station for scanning said bar codes.

4. The transporting apparatus as defined in claim 1, combined with an injection molding machine having an axis of injection; wherein said frame elements are two in number and define a vertically-oriented plane; further comprising means for attaching said frame elements to said injection molding machine at a perpendicular orientation thereto.

5. The transporting apparatus as defined in claim 1, further comprising a lifting spindle mechanism for vertically displacing said elevator; said lifting spindle mechanism including (a) a threaded spindle supported on said frame;
(b) a motor for rotating said spindle; said motor being horizontally oriented and being situated at least approximately in an area coinciding with a vertical projection of said frame;
(c) a gearing connecting said motor with said spindle; and
(d) a threaded nut affixed to said elevator and threadedly engaging said spindle.

6. The transporting apparatus as defined in claim 1, further comprising means in said pallet tower for mutually supporting the transport pallets in the pallet tower at a vertical distance from one another which corresponds at least to a height of one of said transporting units.

7. The transporting apparatus as defined in claim 1, wherein said pallet tower comprises first pallet guides on which said pallets are introducible into said pallet tower and said charging station comprises second pallet guides on which said pallets are introducible into said charging station; further wherein said coupling means comprises driving means for connecting a plurality of pallets by a horizontal displacement thereof with a respective said transporting pallet to form said transporting unit.

8. The transporting apparatus as defined in claim 7, wherein said driving means comprises a horizontally-oriented endless chain supported by end sprockets and a carrier pin attached to said chain to travel therewith and being connectable to a pallet situated in said charging station and said pallet tower.

9. The transporting apparatus as defined in claim 1, wherein said conveying means comprises a transporting vehicle including means for accommodating injection molding tools for the transport thereof; further wherein said transporting pallets include means defining a supporting surface having a configuration conforming to a configuration of the injection molding tools to be transported; the injection molding tools being comprised in the items.

10. The transporting apparatus as defined in claim 9, further comprising a transferring device supported by said transporting vehicle for pulling the transporting units from said pallet tower and pushing the transporting units into said pallet tower; further wherein said transporting pallet has a guide rail provided with a transverse groove; said transporting vehicle having a conveying chain including a carrier member; and means for guiding said carrier member into said transverse groove.

11. A transporting apparatus as defined in claim 1, further comprising positioning means for placing said elevator into such a position during transfer thereto of pallets from said pallet tower and transfer therefrom of pallets into said pallet tower that a transfer of loaded pallets into the transporting pallet is performable at the same location where the pallets are removed from the transporting pallet.

12. The transporting apparatus as defined in claim 1, wherein said carrier elements are vertically oriented; further wherein said transporting pallets have coupling elements; said carrier elements are selectively removable from the coupling elements of said transporting pallets.

13. A transporting unit for moving items to or from an injection molding machine, comprising a transporting pallet and a selected number of pallets removably accommodated on said transporting pallet; each said transporting pallet including pallet guides for individually supporting the selected number of pallets and carrier elements including means for coupling thereto a selected number of superposed pallet guides dependent upon height dimensions of the selected number of pallets.

14. The transporting unit as defined in claim 13, wherein said carrier elements are vertically oriented; further wherein said transporting pallet has coupling elements; said carrier elements are selectively removable from the coupling elements of said transporting pallet.

15. The transporting unit as defined in claim 13, wherein said transporting pallet has a supporting surface conforming to a surface portion of an injection molding tool to be transported; said supporting surface including two parallel guide rails and a transverse web interconnecting said guide rails; at least one of said guide rails having at least one transverse groove for receiving a carrier pin of a conveying chain of a transporting vehicle.

16. The transporting unit as defined in claim 13, further comprising vertically-oriented carrier elements; further wherein said transporting pallet has coupling elements; said carrier elements are selectively removable from the transporting pallet on said coupling elements; further comprising a support plate guided on said pallet guides; and a coupling element mounted on said support plate and engageable by a carrier pin of a conveying chain.

* * * * *